No. 644,128. Patented Feb. 27, 1900.
N. A. CHRISTENSEN.
AUTOMATIC CONTROLLER FOR ELECTRIC COMPRESSORS.
(Application filed Sept. 2, 1899.)
(No Model.) 7 Sheets—Sheet 1.
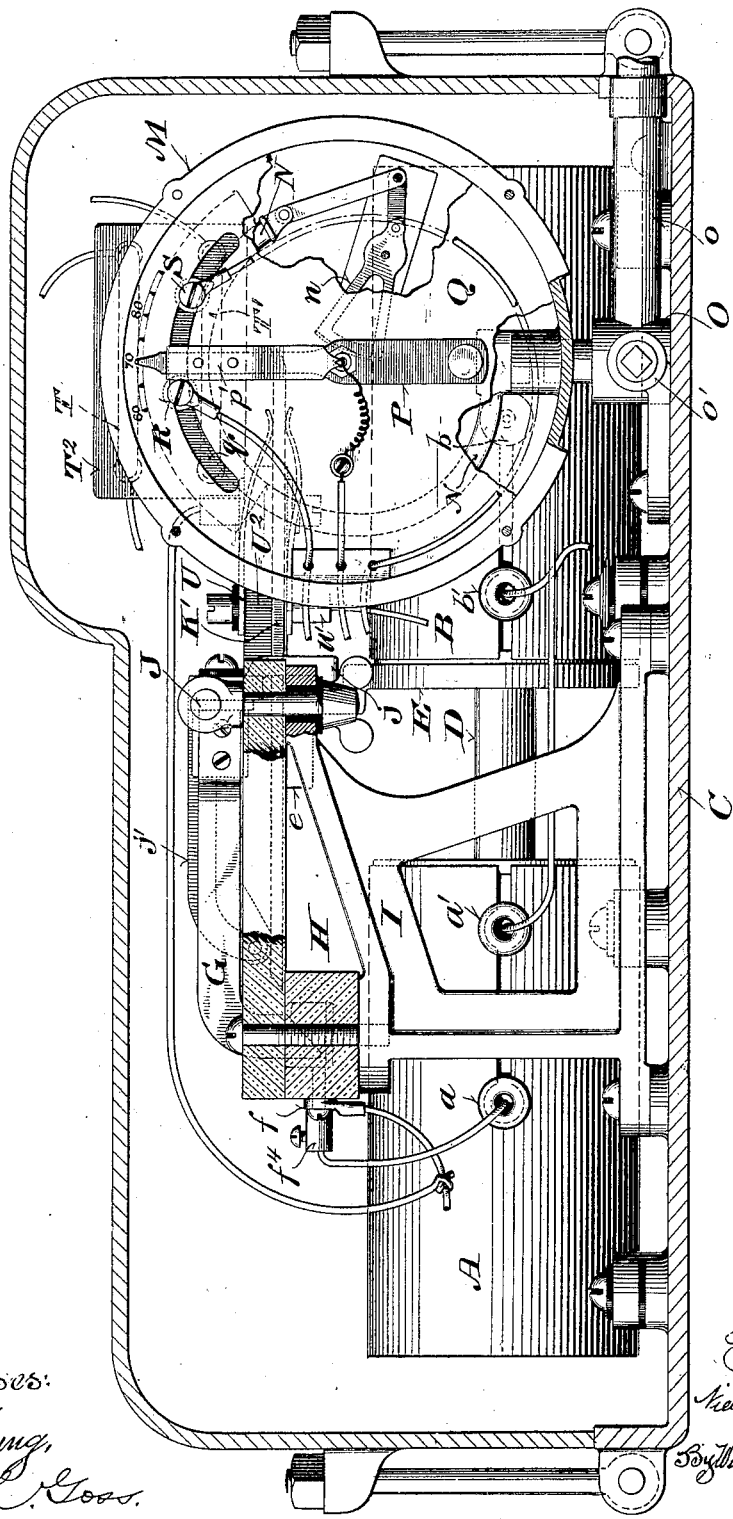
Fig. I.
Witnesses:
Geo. W. Young,
Chas. L. Goss.
Inventor
Niels A. Christensen,
By Winter, [illegible] Smith [illegible]
Attorneys.

No. 644,123. Patented Feb. 27, 1900.
N. A. CHRISTENSEN.
AUTOMATIC CONTROLLER FOR ELECTRIC COMPRESSORS.
(Application filed Sept. 2, 1899.)
(No Model.) 7 Sheets—Sheet 2.
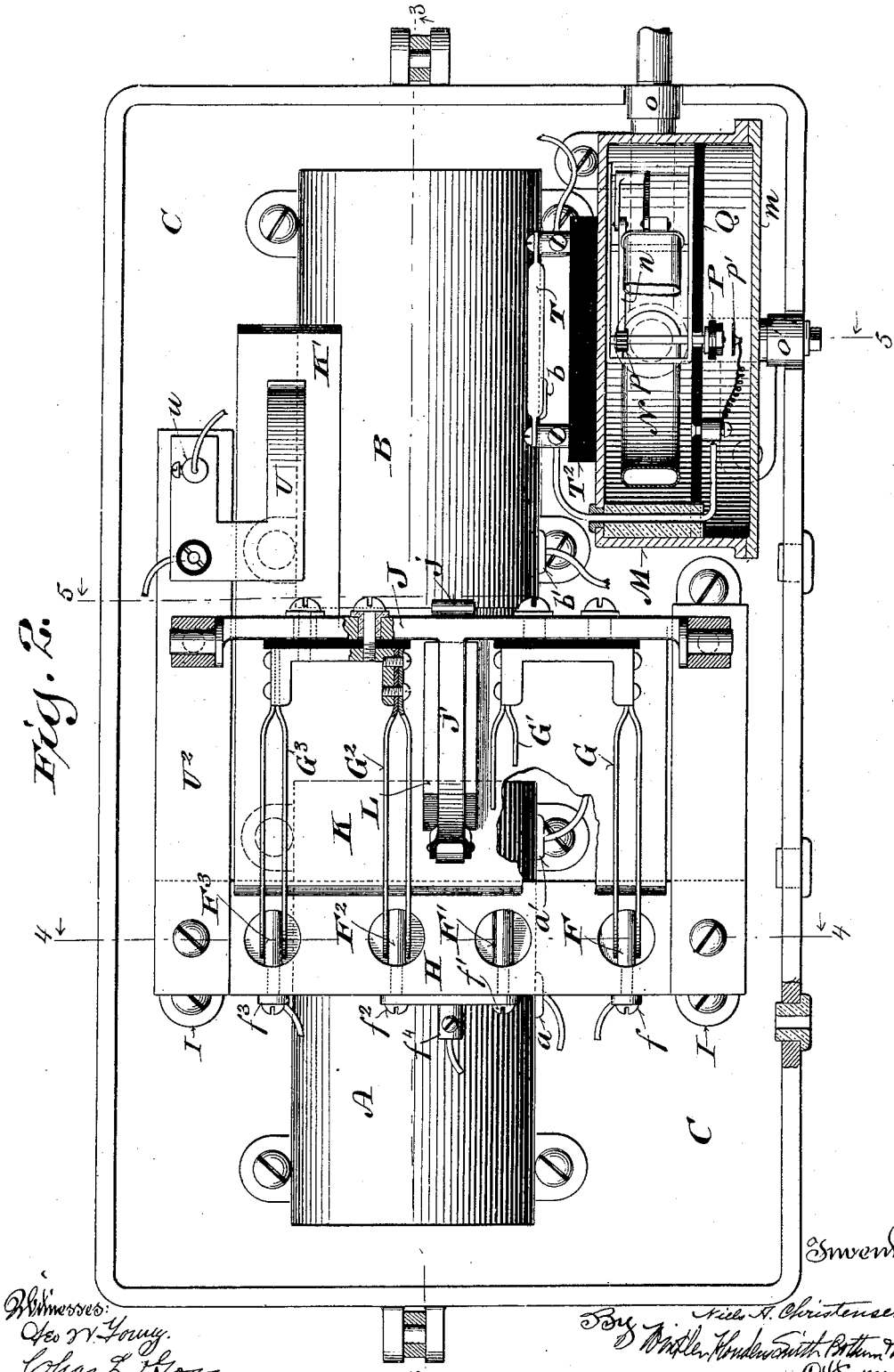

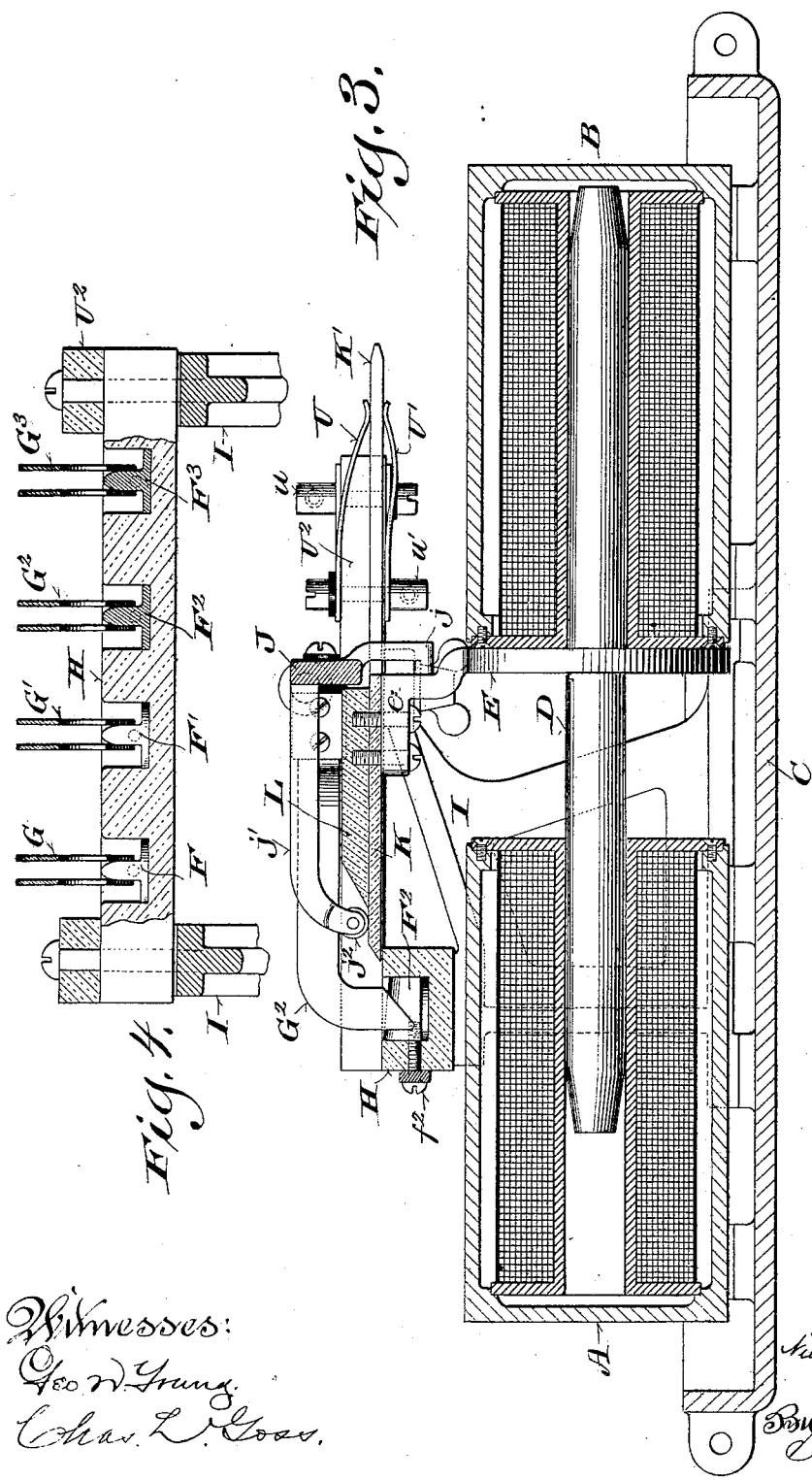

No. 644,128. Patented Feb. 27, 1900.
N. A. CHRISTENSEN.
AUTOMATIC CONTROLLER FOR ELECTRIC COMPRESSORS.
(Application filed Sept. 2, 1899.)
(No Model.) 7 Sheets—Sheet 4.

Witnesses:
Geo. W. Young.
Chas. L. Goss.

Inventor:
Niels A. Christensen,
By Kindler Hordersmith Wilhelm & Silas
Attorneys.

No. 644,128. Patented Feb. 27, 1900.
N. A. CHRISTENSEN.
AUTOMATIC CONTROLLER FOR ELECTRIC COMPRESSORS.
(Application filed Sept. 2, 1899.)
(No Model.) 7 Sheets—Sheet 6.

No. 644,128. Patented Feb. 27, 1900.
N. A. CHRISTENSEN.
AUTOMATIC CONTROLLER FOR ELECTRIC COMPRESSORS.
(Application filed Sept. 2, 1899.)
(No Model.) 7 Sheets—Sheet 7.
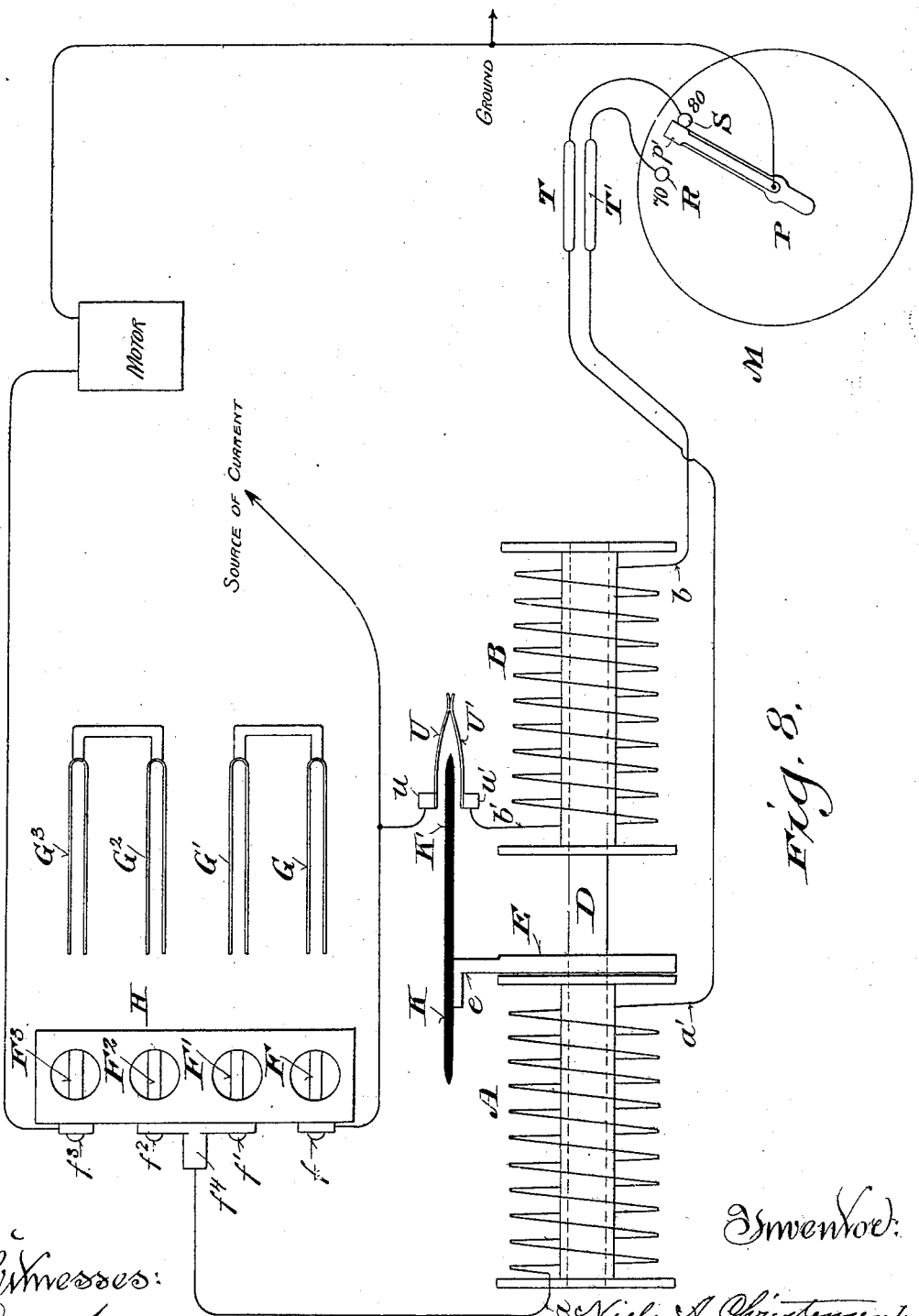

UNITED STATES PATENT OFFICE.

NIELS A. CHRISTENSEN, OF MILWAUKEE, WISCONSIN.

AUTOMATIC CONTROLLER FOR ELECTRIC COMPRESSORS.

SPECIFICATION forming part of Letters Patent No. 644,128, dated February 27, 1900.

Application filed September 2, 1899. Serial No. 729,283. (No model.)

*To all whom it may concern:*

Be it known that I, NIELS A. CHRISTENSEN, a subject of the King of Denmark, residing at Milwaukee, in the county of Milwaukee and State of Wisconsin, have invented certain new and useful Improvements in Automatic Controllers for Electric Compressors, of which the following is a specification, reference being had to the accompanying drawings, forming a part thereof.

My invention relates to electrically-actuated compressors. Its main object is to maintain the pressure within certain limits by automatically stopping the compressor when the pressure reaches the higher limit and starting it when the pressure falls to the lower limit.

It consists in certain novel features of construction and in the arrangement and combination of parts of the controller hereinafter particularly described, and defined in the claims.

In the accompanying drawings like letters designate the same parts in the several figures.

Figure 5:
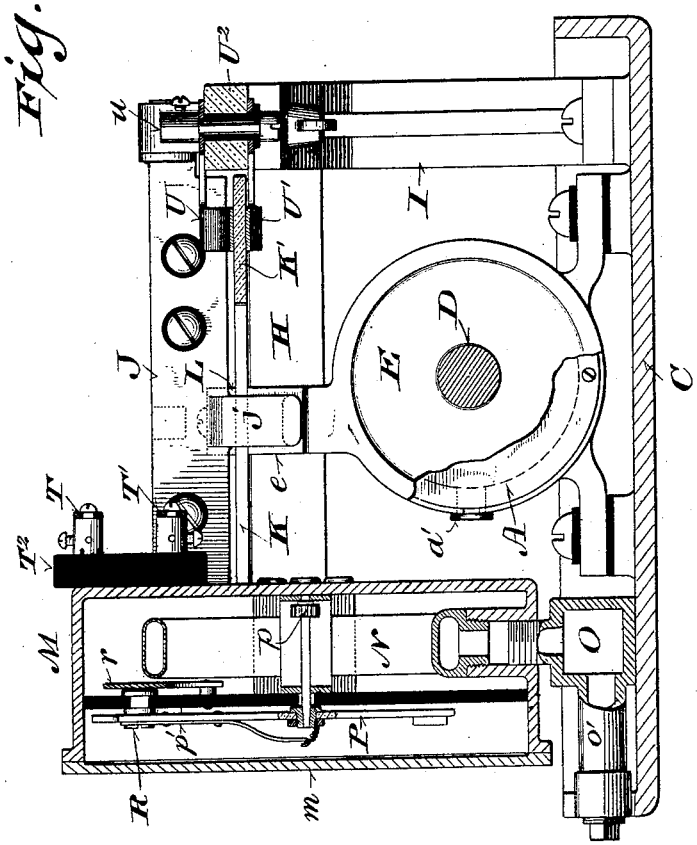
Figure 6:
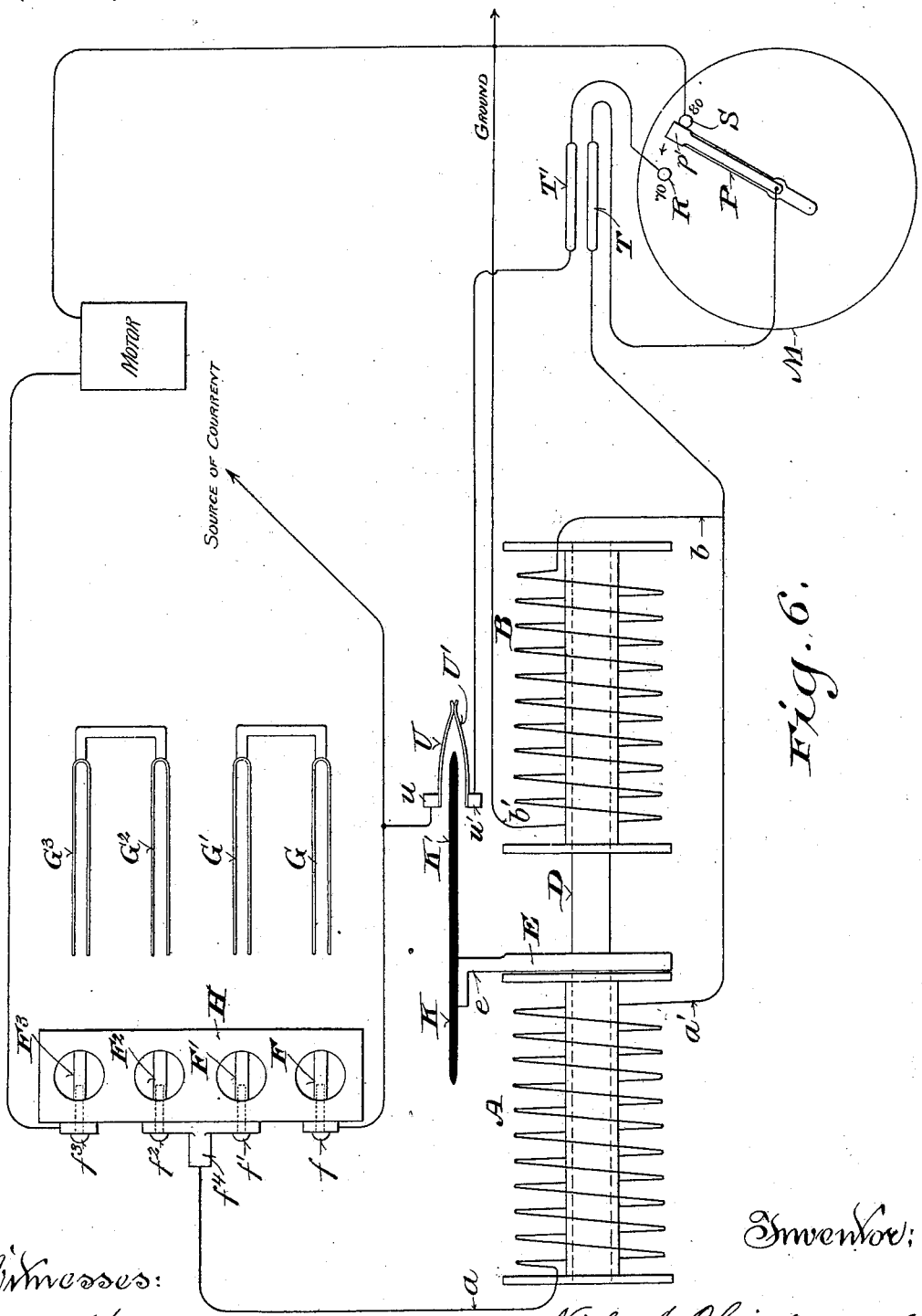
Figure 7:
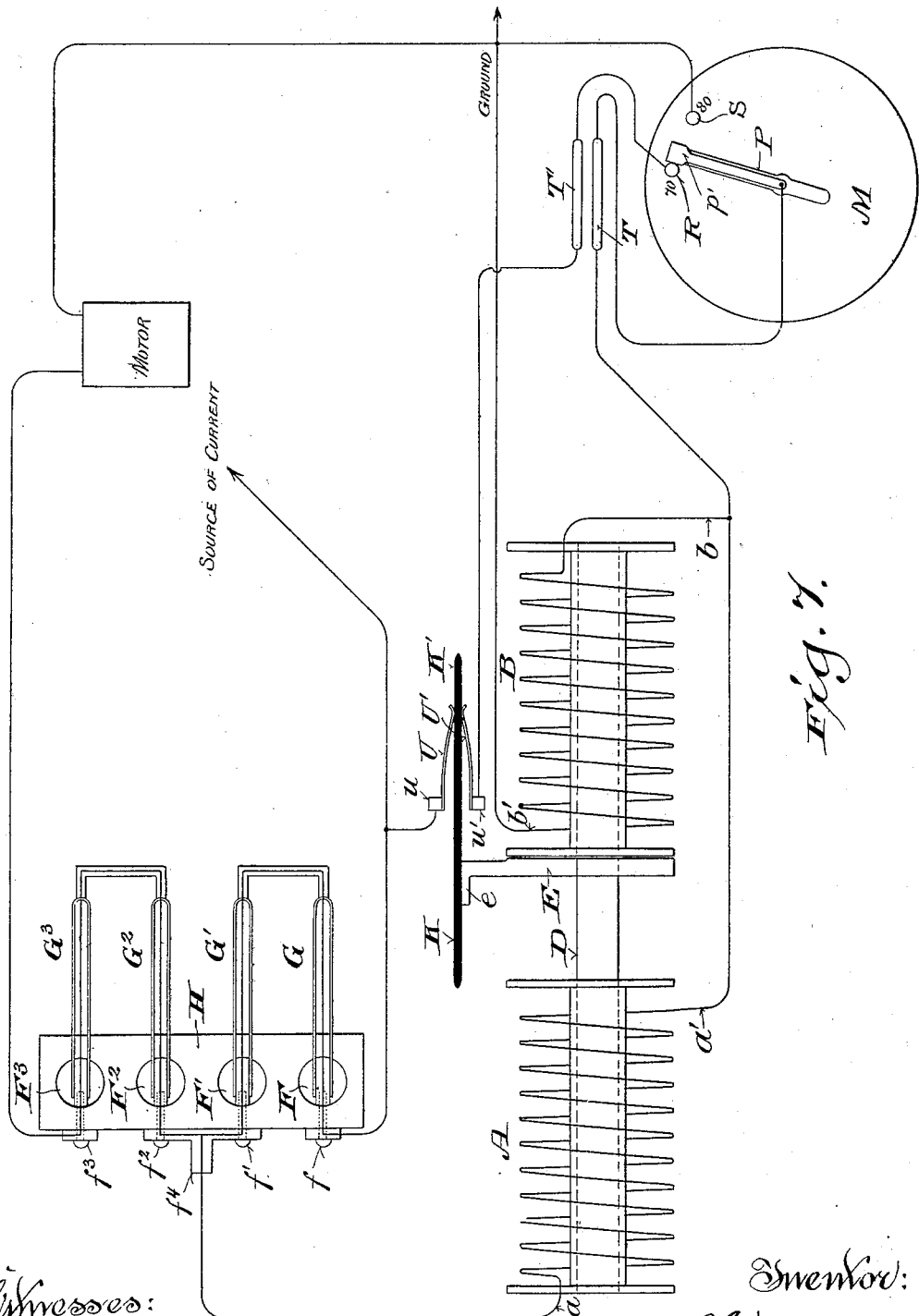

Figure 1 is a front elevation of the mechanism of an automatic controller embodying my improvements, the inclosing case being shown in longitudinal section and parts of the mechanism broken away. Fig. 2 is a plan view of the same, the cover being removed and certain parts of the mechanism broken away and shown in horizontal section. Fig. 3 is a vertical longitudinal section on the line 3 3, Fig. 2. Fig. 4 is a sectional view on the line 4 4 of a part of the main switch, Fig. 2. Fig. 5 is a vertical cross-section on the broken line 5 5, Fig. 2. Figs. 6 and 7 are diagrams showing circuit connections of the controller, Fig. 6 representing the main switch open and Fig. 7 representing it closed; and Fig. 8 is a diagram showing a modified arrangement of the circuit connections.

Referring to Figs. 1 to 5, inclusive, A and B designate two solenoid-magnets mounted in line with each other upon a suitable base C. D is a core common to both magnets, and E is a plate or armature carried by said core between said magnets.

The main switch, controlling the circuit of the compressor-motor, consists of a number of fixed contacts F, F', $F^2$, and $F^3$ and a number of pairs of spring contact-arms G, G', $G^2$, and $G^3$. The fixed contacts are countersunk in a bar H, of insulating material, supported above and transversely to the magnets upon brackets or standards I I. The spring contact-arms are mounted upon a rocking bar J, which is supported parallel with the bar H upon and insulated from the brackets I. Each pair of these spring contact-arms is arranged to be sprung over and to embrace a tongue or raised portion of the corresponding fixed contact. The arms G and G' are electrically connected with each other and insulated from the arms $G^2$ and $G^3$, which are connected with each other in like manner. The rocking bar J is formed or provided with a depending arm $j$ and a horizontally-disposed arm $j'$, curved downwardly and provided with a roller $j^2$ at its free end, which projects toward the bar H. The contacts F, F', $F^2$, and $F^3$ are provided with binding-screws $f$, $f'$, $f^2$, and $f^3$, which project through one side of the insulating-bar H. The binding-screws $f'$ and $f^2$ are electrically connected with a common binding-post $f^4$.

The armature E is formed or provided with an upwardly-extending arm $e$, which is adapted when said armature is drawn toward the magnet B to engage with the arm $j$ of the rocking bar J, and thereby turn the spring contact-arms G, &c., of the switch down into engagement with the fixed contacts F, &c. To the arm $e$ is attached a strip or plate K of vulcanized fiber or any suitable insulating material, which is constructed and arranged to be thrust between the fixed and movable contacts of the switch when they are separated, and thereby serves as a spark arrester or intercepter to prevent the formation of arcs between said contacts. Upon said intercepting strip or plate K is mounted a block L, which is beveled or inclined at the end toward the insulating-bar H and is attached with said strip or plate to the arm $e$ in line with the roller $j^2$, so that when the armature E is moved toward the magnet A the arm $j'$ will be lifted, thereby raising the spring contact-arms G, &c., out of engagement with the fixed contacts F, &c.

M is a manometer or pressure-gage containing a Bourdon spring-tube N, which is attached to and communicates at one end with a fluid-pressure-supply pipe O, leading from the compressor or a reservoir into which the compressor discharges. This fluid-pressure-supply connection is formed or provided for convenience in connecting the controller under varying conditions with two branches $o$ and $o'$, one leading through the end and the other through the side of the case or base C. Whichever of these branches is not used in connecting the controller with the compressor or reservoir is closed with a plug or by other suitable means. The free end of the spring-tube is connected by links with a segment-gear $n$, which engages with a pinion P on the arbor of a hand or index P, preferably made of non-conducting material and carrying a metallic or conducting contact $p'$. The connections above described multiply or increase the movement imparted by the spring-tube N to the contact $p'$.

Q is a dial or face plate through which the arbor of the hand projects at its front end and over which the hand is arranged to vibrate. This dial or face plate may be provided with a scale, as indicated in Fig. 1, to facilitate the adjustment of the controller for maximum and minimum pressures, as hereinafter explained.

R and S are minimum and maximum pressure contacts adjustably secured in a curved slot $q$ of the face-plate or dial on opposite sides of the movable contact $p'$, carried by the hand P.

$r$ is a back plate or guard arranged behind and opposite the slot $q$ in the dial for holding the inner parts of the contacts R and S in said slot when they are released for adjustment.

The parts of the pressure-gage above enumerated are inclosed in a suitable case, which is provided on the front side with a removable cover $m$.

T T' are fuses through which the electrical connections with the contacts of the pressure-gage are made. They are mounted upon an insulating-block $T^2$, which is attached to the back of the case of the pressure-gage.

U and U' are insulated contact-springs attached to the upper and under sides of a longitudinal bar $U^2$, carried by the rear bracket I. They are constructed and arranged to normally engage with each other and to be separated by an insulating-strip K', which is carried by the armature E and may be formed with the spark-arresting strip or plate K. The upper spring U is electrically connected with a binding-post $u$, and the lower spring U' is connected in like manner with a binding-post $u'$.

$a$ and $a'$ designate the terminals of the coil of magnet A, and $b$ and $b'$ designate the terminals of the coil of magnet B.

The controller may be placed in the circuit between the compressor-motor and the source of current, the circuit connections when the controller is so arranged with relation to the motor and source of current being shown by the diagrams in Figs. 6 and 7, according to which the binding-posts $f$ and $u$ are connected with the source of current. The binding-post $f^3$ is connected with one terminal of the compressor-motor, the other terminal of said motor being connected with the ground. The binding-post $f^4$ is connected with the terminal $a$ of magnet A, the other terminal $a'$ of said magnet being connected with the terminal $b$ of magnet B. The other terminal $b'$ of magnet B is connected with the ground. The terminal $a'$ of magnet A and the terminal $b$ of magnet B are connected through the fuse T with the movable contact $p'$ of the pressure-gage. The binding-post $u'$ is connected through the fuse T' with the minimum-pressure contact R, the contact-springs U U' and the insulating-strip K' thus constituting a circuit breaker or controller in a shunt between the source of current and the minimum-pressure contact, and the maximum-pressure contact S is connected with the ground or return.

When connected as above explained, the controller operates as follows: Assuming that the pressure has reached the maximum limit and that the movable contact $p'$ has been turned into engagement with the maximum-pressure contact S, as shown in Fig. 6, the contacts of the main switch G F, &c., will be separated, thereby cutting off current from the motor and stopping the compressor, and the contact-springs U and U' will be released and allowed to engage with each other, thereby closing the shunt connection between the source of current and the minimum-pressure contact R. Under these conditions the armature E will remain at the left next to the magnet A and the circuit through both magnets will be broken. As the pressure falls the hand P will be turned gradually to the left, and when the minimum limit for which the controller is adjusted is reached the contact $p'$ will be brought into engagement with the contact R, thereby closing the shunt-circuit through magnet B and energizing said magnet. The circuit through magnet A remaining open, the armature E will be drawn by the magnet B to the right, thereby closing the main switch and separating the contacts of the circuit-controller in the shunt which connects the minimum-pressure contact with the source of current. The parts of the controller will now occupy the positions and the circuits will be established, as shown in Fig. 7, current passing through the contacts of the main switch to the motor, and thence to the ground, thereby starting the compressor, which will remain in operation until the maximum limit for which the controller is adjusted is reached. A portion of the current will be shunted when the main switch is thus closed from the binding-post $f^4$, through the coils of the two magnets and thence to the ground; but this will not change the position of the armature E, which by reason of its closer proximity with the magnet B will be held by said magnet while both magnets remain energized. As the pressure rises the hand P will be turned gradually back to the right, and when the maximum limit is reached the contact $p'$ will engage with the maximum-pressure contact S, thereby closing the direct ground connection for the magnet A through said movable and maximum-pressure contacts and short circuiting the magnet B. The magnet A, remaining energized while the magnet B is thus deënergized, draws the armature E back to the left into the position in which it is shown in Fig. 6, thereby opening the main switch, stopping the compressor, and closing the circuit-controller in the shunt connecting the low-pressure contact R with the source of current. Immediately after the beveled or inclined block L lifts the arm $j'$, turning the contact-springs G, &c., up out of engagement with the fixed contacts, F, &c., the spark-arresting plate K is thrust between said arms and contacts, thereby preventing the formation of arcs between them and consequent injury to the apparatus.

The controller may also be placed on the ground side of the motor by simply reversing the circuit connections, making the connection with the source of current at the point designated "ground" in Figs. 6 and 7 and the ground connection at the point designated "source of current" in the same figures.

The circuit connections may also be arranged as shown in Fig. 8, in which the direct electrical connection between the two magnets A and B is omitted, the terminal $a'$ of magnet A being connected with the maximum-pressure contact S, one terminal of the magnet B with the contact-spring U' and the other terminal of said magnet with the low-pressure contact R, and the movable contact $p'$ of the pressure-gage being connected directly with the ground. In other respects the connections are substantially the same as those shown in Figs. 6 and 7. With this arrangement of circuit connections the controller may be placed on the ground or return side of the motor by simply inverting or reversing the connections with the source of current and with the ground or return.

The controller herein shown and described is specially designed for use in connection with air-brake systems for electric railways employing independent motors for supplying compressed air to operate the brakes; but it may be used for other purposes.

Various changes in details of construction and arrangement of parts may be made within the spirit and intended scope of my invention.

I claim—

1. In an automatic controller for electric compressors the combination of a movable contact having a fluid-pressure-actuating connection, maximum and minimum pressure contacts arranged to coöperate with said movable contact, a switch in the compressor-motor circuit, two magnets having circuit connections so arranged that when said movable contact engages the maximum-pressure contact the switch will be opened and the compressor stopped and when it engages the minimum-pressure contact the switch will be closed and the compressor started, and a spark-arrester arranged to be thrust between the contacts of said switch as soon as they are separated, substantially as and for the purposes set forth.

2. In an automatic controller for electric compressors the combination of a movable contact having a fluid-pressure-actuating connection, maximum and minimum pressure contacts arranged to coöperate with said movable contact, a switch in the compressor-motor circuit, two magnets connected in series with each other and with said switch and arranged to open and close the same, the coil of one of said magnets being connected at one end with the ground or return, and at the other end with said movable contact, the maximum-pressure contact being connected with the ground or return and the minimum-pressure contact with the source of current, and a circuit-controller in the circuit connection of the minimum-pressure contact arranged to be closed when the main switch is opened and vice versa, substantially as and for the purposes set forth.

3. In an automatic controller for electric compressors the combination of a movable contact, a spring-tube having a fluid-pressure-actuating connection and connected with and arranged to actuate said movable contact, maximum and minimum pressure contacts arranged to coöperate with said movable contact, a switch in the compressor-motor circuit, and two magnets having circuit connections so arranged that when said movable contact engages the maximum-pressure contact the switch will be opened and the compressor stopped, and when it engages the minimum-pressure contact the switch will be closed and the compressor started, substantially as and for the purposes set forth.

4. In an automatic controller for electric compressors the combination of a hand or index carrying an electrical contact, a spring-tube having a fluid-actuating connection and an actuating connection with said hand or index, a plate or dial having a curved slot, maximum and minimum pressure contacts adjustably secured in said slot on opposite sides of and in the path of the movable contact carried by said hand or index, a switch in the compressor-motor circuit, and two magnets having circuit connections so arranged that when said movable contact engages the maximum-pressure contact the switch will be opened and the compressor stopped, and when it engages the minimum-pressure contact the switch will be closed and the compressor started, substantially as and for the purposes set forth.

5. In an automatic controller for electric compressors the combination of a movable contact having a fluid-pressure-actuating connection, maximum and minimum pressure contacts arranged to coöperate with said movable contact, a switch in the compressor-motor circuit comprising fixed insulated contacts and a series of pivoted spring contact-arms adapted to be turned into and out of engagement with said fixed contacts, two magnets adapted to open and close said switch, and a spark-arrester arranged to be thrust by said magnets between the contacts of said switch as soon as they are separated, said magnets having circuit connections so arranged that the switch will be opened and the compressor stopped when the maximum-pressure contact is engaged by the movable contact and said switch will be closed and the compressor started when the minimum-pressure contact is engaged by said movable contact, substantially as and for the purposes set forth.

6. In an automatic controller for electric compressors the combination of a movable contact having a fluid-pressure-actuating connection, maximum and minimum pressure contacts arranged to coöperate with said movable contact, a switch in the compressor-motor circuit comprising a number of fixed insulated contacts, a rocking bar having a series of spring contact-arms mounted thereon and adapted to be turned into and out of engagement with said fixed contacts, two magnets the armature of which is adapted to close said switch, an incline carried by said armature in position by engagement with an arm of said rocking bar to open said switch, and a spark-arresting plate carried by said armature in position to be thrust between the contacts of the switch as soon as they are separated by said incline, substantially as and for the purposes set forth.

7. In an automatic controller for electric compressors the combination of a movable contact having a fluid-pressure-actuating connection, maximum and minimum pressure contacts arranged to coöperate with said movable contact, a main switch in the compressor-motor circuit, two magnets for operating said switch connected in series with each other and with said switch, the coil of one of said magnets being connected at one end with the ground or return and at the other end with said movable contact, the maximum-pressure contact being connected with the ground and the minimum-pressure contact having a shunt connection with the source of current, a circuit-controller in said shunt connection consisting of two normally-engaging springs or contacts, and an insulating-strip operated by said magnets to separate said springs when the main switch is closed and to release them and permit them to come together when the main switch is opened, substantially as and for the purposes set forth.

8. In an automatic circuit-controller for electric compressors the combination of a movable contact having a fluid-pressure-actuating connection, maximum and minimum pressure contacts arranged to coöperate with said movable contact, a switch in the compressor-motor circuit, two magnets arranged to open and close said switch and connected in series with each other, the coil of one of said magnets being connected at one end with the ground or return and at the other with said movable contact, the maximum-pressure contact being connected with the ground or return and the minimum-pressure contact having a shunt connection with the source of current, a circuit-controller in said shunt connection consisting of two normally-engaging contacts, an insulating-strip operated by said magnets to separate the contacts of said shunt-circuit controller when the main switch is closed, and a spark-arrester also operated by said magnets and adapted to be thrust between the contacts of said switch when they are separated, substantially as and for the purposes set forth.

9. In an automatic circuit-controller for electric compressors the combination of a movable contact having a fluid-pressure-actuating connection, maximum and minimum pressure contacts arranged to coöperate with said movable contact, a switch in the compressor-motor circuit consisting of fixed insulated contacts and of a number of spring contact-arms carried by a rocking bar, two solenoid-magnets having a common core adapted by engagement with an arm on said rocking bar to close said switch, an incline carried by said core and adapted by engagement with an arm of said rocking bar to open said switch, said magnets being connected in series with each other, the coil of one magnet being connected at one end with the ground or return and at the other end with said movable contact, the maximum-pressure contact being connected with the ground or return and the minimum-pressure contact having a shunt connection with the source of current, a circuit-controller in said shunt connection consisting of two normally-engaging springs or contacts, an insulating-strip carried by the core of said magnets and adapted to separate the contacts of the shunt-circuit controller when said switch is closed and vice versa, and a spark-arrester also carried by said core and arranged to be thrust between the contacts of said switch when they are separated, substantially as and for the purposes set forth.

10. In an automatic controller for electric compressors the combination with a movable contact having a fluid-pressure-actuating connection, maximum and minimum pressure contacts arranged to coöperate with said movable contact, a main switch in the compressor-motor circuit, two magnets for operating said switch, and a circuit-controller operated by said magnets and arranged to be opened when the main switch is closed and vice versa, said circuit-controller being arranged in a shunt connected with one of the aforesaid contacts and controlling the current-supply through said shunt to one of said magnets, substantially as and for the purposes set forth.

11. In an automatic controller for electric compressors the combination with a movable contact having a fluid-pressure-actuating connection and maximum and minimum pressure contacts adapted to coöperate with said movable contact, of two magnets adapted to control the compressor-motor circuit, two switches or circuit-breakers operated by said magnets and controlling the circuits including said magnets, each switch or circuit-breaker being arranged to open when the other closes and vice versa, said magnets having circuit connections so arranged that when said movable contact engages the maximum-pressure contact the compressor will be stopped and when said movable contact engages the minimum-pressure contact the compressor will be started, substantially as and for the purposes set forth.

12. In an automatic controller for electric compressors the combination with a movable contact having a fluid-pressure-actuating connection and maximum and minimum pressure contacts adapted to coöperate with said movable contact, of two magnets adapted to control the compressor-motor circuit, two switches or circuit-breakers operated by said magnets and controlling the circuits including said magnets, each switch or circuit-breaker being arranged to open when the other closes and vice versa, and insulating-strips arranged to be thrust by said magnets between the contacts of said switches or circuit-breakers when they are separated, said magnets having circuit connections so arranged that when said movable contact engages the maximum-pressure contact the compressor will be stopped and when it engages the minimum-pressure contact the compressor will be started, substantially as and for the purposes set forth.

13. In an automatic controller for electric compressors the combination with a switch controlling the compressor-motor circuit and two magnets arranged to open and close said switch, of a pressure-gage comprising a movable part arranged to be actuated by fluid-pressure and a contact connected with said movable part by multiplying-gearing, and insulated maximum and minimum pressure contacts arranged on opposite sides and in the path of said movable contact, said magnets having circuit connections with said pressure-gage so arranged that when said movable contact engages the maximum-pressure contact the switch will be opened and the compressor stopped, and when said movable contact engages the minimum - pressure contact the switch will be closed and the compressor started, substantially as and for the purposes set forth.

In witness whereof I hereto affix my signature in presence of two witnesses.

NIELS A. CHRISTENSEN.

Witnesses:
CHAS. L. GOSS,
ELINOR V. WRIGHT.